United States Patent [19]

Hartmann

[11] 4,268,119
[45] May 19, 1981

[54] COLOR-SEPARATING OPTICAL SYSTEM

[75] Inventor: Rudolf Hartmann, Winter Park, Fla.

[73] Assignee: Bell & Howell Company, Chicago, Ill.

[21] Appl. No.: 5,180

[22] Filed: Jan. 22, 1979

[51] Int. Cl.³ .................... G02B 7/18; G02B 27/10
[52] U.S. Cl. ............................ 350/173; 350/320; 358/55
[58] Field of Search ............ 350/173, 171, 286, 287, 350/320, 67; 358/55, 52, 50

[56] References Cited

U.S. PATENT DOCUMENTS

| | | | |
|---|---|---|---|
| 2,642,487 | 6/1953 | Schroeder | 358/55 |
| 2,707,418 | 5/1955 | Magnuson | 350/257 |
| 2,971,051 | 2/1961 | Back | 350/173 |
| 3,381,084 | 4/1968 | Wheeler | 358/55 |
| 3,631,783 | 1/1972 | Jones | 354/288 |
| 3,640,195 | 2/1972 | Zimmerman et al. | 354/288 |
| 3,653,748 | 4/1972 | Athey | 350/171 |
| 3,659,918 | 5/1972 | Tan | 358/55 |
| 3,668,304 | 6/1972 | Eilenberger | 350/173 |
| 3,681,521 | 8/1972 | Doi et al. | 350/171 |
| 3,794,407 | 2/1974 | Nishimura | 350/171 |
| 3,802,763 | 4/1974 | Cook et al. | 350/173 |
| 3,896,464 | 7/1975 | Galvin | 354/161 |
| 3,945,034 | 3/1976 | Suzuki | 358/50 |
| 4,009,941 | 3/1977 | Verdijk et al. | 350/173 |
| 4,085,419 | 4/1978 | Sekiguchi | 358/55 |

OTHER PUBLICATIONS

Sokolova, R. S., *Sov. Jour. of Optical Tech.*, vol. 37, No. 5, May 1970, pp. 318–320.

*Primary Examiner*—Jon W. Henry
*Attorney, Agent, or Firm*—Harold V. Stotland; Roger M. Fitz-Gerald

[57] ABSTRACT

A color-separating prism arrangement for a small portable video camera having solid-state detectors about 0.35 inch in height includes three prisms with the first and second prisms being separated by an air gap, and color separation occurring at respective spectrally selective dichroic plates between the first and second prisms and the second and third prisms, respectively, the separated color components being directed in different directions. The specific geometry of the system provides a prism assembly which is extremely small and compact, having an overall length of about 1.1 inches and an entrance face height of about 1 inch, and with each of the exit faces of the assembly having an effective height of about ½ inch.

Each detector is accurately held in position with respect to the associated prism by disposing therebetween and in contact therewith a resilient gasket of foamed material, adjusting the position of the detector, then impregnating the foamed gasket with epoxy resin which sets rigidly to hold the detector in position with respect to the prism.

8 Claims, 5 Drawing Figures

COLOR-SEPARATING OPTICAL SYSTEM

BACKGROUND OF THE INVENTION

The present invention relates to color-separating prism systems for video cameras, and is, in part, an improvement of the prism system set forth in the co-pending application of Arthur Cox and Rudolf Hartmann, Ser. No. 06/005,187 filed on even date herewith and assigned to the assignee of the present invention, now abandoned.

The Cox and Hartmann application discloses a very small color-separating prism system uniquely adapted for use with very small solid-state detector devices, such as charge injection devices (CID's), in portable video color cameras suitable for private home use, preferably in conjunction with a video tape recording system.

Conventional color-separating prism systems for video cameras consist of prism components which have dichroic coatings applied directly to the prism faces. This requires careful handling of the components during the coating process to prevent damage from chipping, and also requires custom-made, expensive tooling for the handling of the prism during the coating thereof. Also, since the surfaces to be coated must be laid into holders, some margins of the surfaces will not receive coating. If coatings turn out to be unacceptable, the prisms must be stripped and recoated, a procedure which is quite expensive and subjects the prisms to additional danger of damage.

Additionally, it is imperative in video color cameras that the individual color detectors be very accurately positioned with respect to the associated prism output faces. More particularly, each detector must be carefully positioned without tilt with respect to a certain optical axis of the optical system, must be carefully positioned in directions parallel to and perpendicular to that axis, and the three detectors must be positioned without rotation relative to each other. This positioning is particularly critical and delicate in connection with very small solid-state detectors such as charge-injection devices. In conventional video cameras expensive and complicated detector mountings have been necessary to insure maintenance of each detector in its predetermined position.

SUMMARY OF THE INVENTION

The present invention comprises an improved color-separating prism system suitable for use with extremely small solid-state detectors.

More particularly, it is an important object of the present invention to provide a color-separating prism system which includes a minimum number of prism elements, while at the same time affording a very small overall size compatible with small solid-state color detectors in portable video cameras.

Another object of this invention is to provide a color-separating prism system of the type set forth, wherein the dichroic layers are formed without risk of injury to the associated prism faces.

More particularly, it is an object of this invention to provide a color-separating prism system of the type set forth, wherein the dichroic coatings are contained on separate plates which are cemented to the appropriate prism faces.

Another object of this invention is to provide a simple and economical method of accurately and rigidly holding each detector of a video color camera in a predetermined position with respect to the associated prism member.

Still another object of the invention is to provide an optical system comprising an optical member and a detector accurately and rigidly held in position with respect to each other.

Certain ones of these objects of the invention are attained by providing an optical system for separating color components of light directed along a non-reflecting optical axis in a small portable video color camera having for each separated color component a solid-state detector of very small predetermined height, the system comprising a prism assembly including first and second and third prisms and having a light entrance face on the first prism, a first dichroic plate fixedly secured to the first prism and spaced from the second prism by an air gap for receiving light entering the first prism through the input face and selectively reflecting a first color component while transmitting remaining light components to the second prism, a second dichroic plate disposed between the second and third prisms and fixedly secured to each for selectively reflecting a second color component while transmitting the remaining light component to the third prism, three exit faces respectively disposed on the three prisms and each optically coupled to an associated one of the detectors, the prisms and the dichroic plates being arranged so that the three separated color components are respectively emitted from the prism assembly through the three exit faces, the entrance face and one of the exit faces being disposed substantially perpendicular to the non-reflecting optical axis and being spaced apart a distance substantially three times the predetermined detector height, the other two exit faces being respectively disposed on opposite sides of the non-reflecting optical axis and respectively inclined thereto at first and second acute angles.

Others of the objects of the invention are attained by providing the combination of an optical member having an axis and a detector having an image area and rigidly held in a predetermined position with respect to the optical member and the axis, wherein the combination is formed by the process comprising the steps of placing between and in contact with the optical member and the detector a porous flexible resilient body having an opening therethrough sufficient to permit uninterrupted passage of light rays from the optical member to the image area of the detector, adjusting the detector to a predetermined position with respect to the optical member and the axis thereof while maintaining the body in contact with the optical member and the detector, impregnating the porous body with a hardening and adhesive agent while holding the detector in the predetermined position, and allowing the agent to harden while holding the detector in the predetermined position thereby to form a rigid body fixedly secured to the optical member and to the detector and rigidly holding the detector in the predetermined position.

Further features of the invention pertain to the particular arrangement of the parts of the color-separating optical system whereby the above-outlined and additional operating features thereof are attained.

The invention, both as to its organization and method of operation, together with further objects and advantages thereof, will best be understood by reference to the following specification taken in connection with the accompanying drawings:

DESCRIPTION OF THE PREFERRED EMBODIMENT

Figure 1:
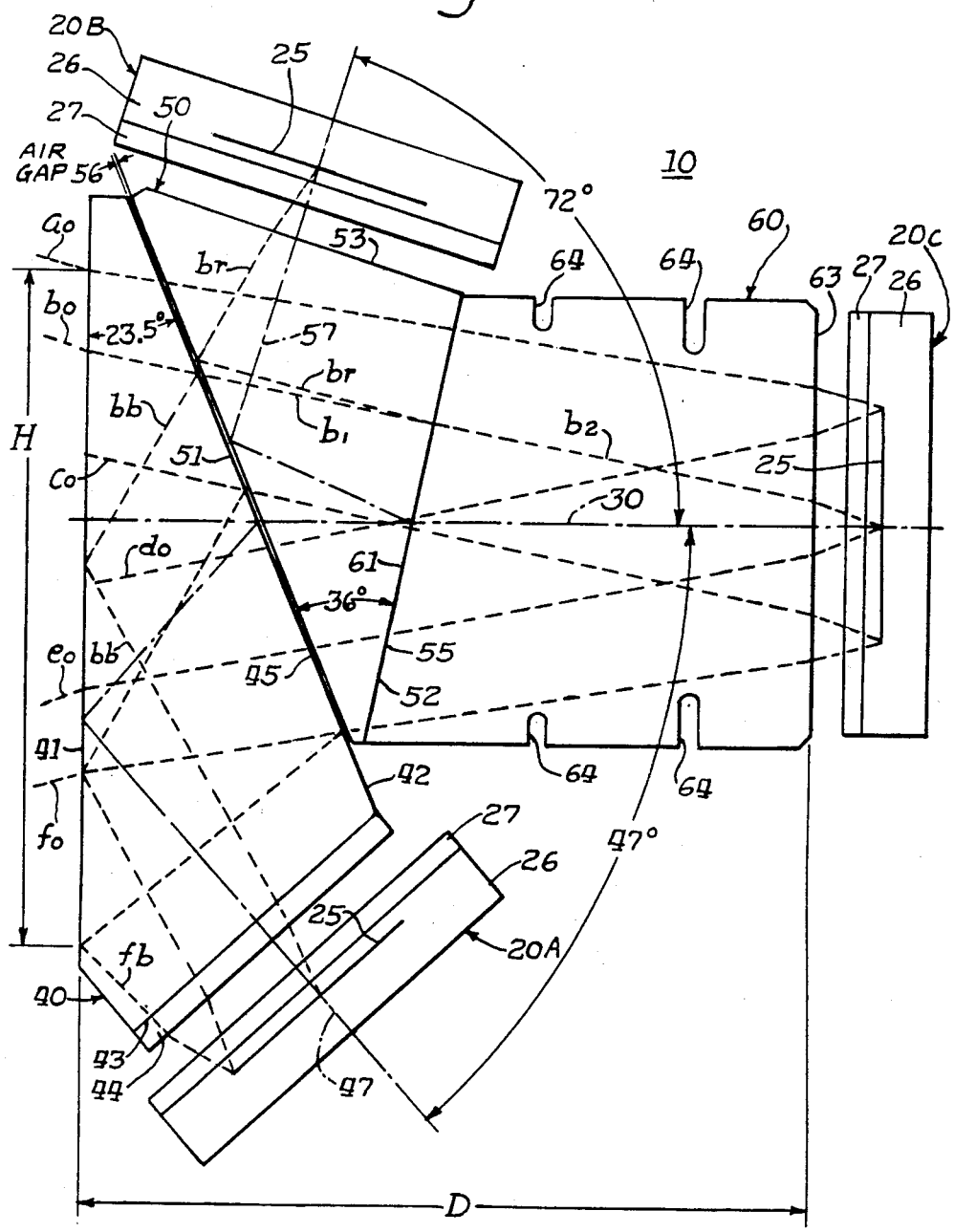
FIG. 1 is a schematic side elevational view of the prism system of the present invention, illustrating the relationship of the prism system with the associated solid-state detectors of a video camera.

Referring to FIG. 1 of the drawings, there is illustrated an optical system, generally designated by the numeral 10, constructed in accordance with and embodying the features of the present invention for separating color components of incident light and directing those color components respectively to three solid-state detector units 20A, 20B and 20C of a small portable color video camera. The detector units 20A–C are substantially identical in construction, each being in the form of a charge injection device comprising a detector element 25 embedded in a ceramic substrate 26, the obverse face of which is covered with a glass plate 27. The dimensions of the detector element 25 are such as to afford a sensitive image area having a height of 0.343 inch and a width of 0.457 inch. The video camera also preferably includes a zoom objective lens (not shown) disposed to the left of the optical system 10, as viewed in FIG. 1, which directs light rays to the optical system 10, the objective lens system preferably being F/1.4, substantially telecentric and vignetting-free for the image height.

The optical system 10 has a non-reflecting optical axis 30, and includes three prisms, respectively designated by the numerals 40, 50 and 60, each of which prisms is preferably formed of SF4 glass having an index of refraction of 1.755 and a dispersive constant of 27.6. The prism 40 has a flat entrance face 41 disposed substantially normal to the non-reflecting optical axis 30, an exit face 42 inclined with respect to the entrance face 41 at an angle of 23°30′, and an exit face 43 inclined with respect to the entrance face 41 at an angle of substantially 47°. The exit face 43 is preferably fitted with a blue absorption filter 44. Coating the exit surface 42 is a dichroic layer 45, the characteristic of which is such that it reflects the blue component of incident light and passes the remaining component of the light. The orientation of the exit face 42 is such that it reflects the blue component of the light back toward the entrance face 41 which, in turn, totally internally reflects the blue light toward the exit face 43, so that the blue light is emitted from the exit face 43 and through an absorption filter 44 generally along an exit path, the axis of which has been designated by the numeral 47.

The prism 50 has a flat entrance face 51 which is disposed parallel to the exit face 42 of the prism 40 and is spaced therefrom by an air gap, generally designated by the numeral 56. The prism 50 has an exit face 52 which is inclined at an angle of 36° to the entrance face 51 and an exit face 53 which is inclined with respect to the entrance face 41 of the prism 40 substantially at an angle of 72°. Disposed on the exit face 52 of the prism 50 is a dichroic layer 55, the characteristic of which is such that it reflects the red component of incident light and passes the remaining component.

From the foregoing it is apparent that the dichroic layer 45 is disposed at an angle of 23.5° with respect to a plane perpendicular to the non-reflecting optical axis 30, while the dichroic layer 55 is inclined at an angle of 12.5° with respect to a plane perpendicular to the non-reflecting optical axis 30. The orientation of the dichroic layer 55 is such that the incident red light component is reflected toward the entrance face 51 which, because it forms a boundary with the air gap 56, totally internally reflects the red light component toward the exit face 53 for emission therefrom generally along an exit path, the axis of which has been designated by the numeral 57.

The prism 60 has an entrance face 61 which is cemented to the exit face 52 of the prism 50, with the dichroic layer 55 being disposed therebetween. The prism 60 also has a flat exit face 63 which is disposed perpendicular to the non-reflecting optical axis 30. Provided along the peripheral edges of the prism 60 is a plurality of baffle notches 64 of varying depths.

In FIG. 1 there are depicted a plurality of oblique incident light rays, including the rays $a_0$, $b_0$, $c_0$, $d_0$, $e_0$, and $f_0$. The rays $a_0$ and $d_0$ are in the cone of rays which form a point at the upper edge of the object image, the rays $b_0$ and $e_0$ are in the cone of rays which form the point at the center or axis of the object image, and the rays $c_0$ and $f_0$ are in the cone of rays forming a point at the lower edge of the object image. The rays $a_0$ and $f_0$ are limiting oblique rays, while the rays $b_0$ and $e_0$ are in the axial bundle of rays. Axial and oblique bundles are substantially equal.

By way of example, the path of the ray $b_0$ will be traced through the optical system 10. It will be understood that the other rays undergo similar reflections, although only a few of the rays have been traced to the exit faces of the system in the interest of simplicity of the drawing. The ray $b_0$ is incident on the entrance face 41 of the prism 40 and is refracted, the refracted ray being incident on the first dichroic layer 45, with the blue component $b_b$ being reflected back toward the entrance face 41, while the remaining component $b_1$ of the ray passes through the dichroic layer 45 and the air gap 56 and is incident on the prism 50 at the entrance face 51 thereof. The blue component $b_b$ of the ray is totally internally reflected at the entrance face 41 of the prism 40 and exits through the exit face 43 and the blue absorption filter 44 thereof for transmission to the detector unit 20A at the center thereof.

The remaining component $b_1$ of the ray is incident on the second dichroic layer 55, the red component $b_r$ thereof being reflected back toward the entrance face 51, while the remaining green component $b_g$ thereof passes through the dichroic layer 55 and enters the prism 60 at the entrance face 61 thereof. The red component $b_r$ of the ray is totally internally reflected at the entrance face 51 and exits through the exit face 53 for transmission to the detector unit 20B at the center thereof. The remaining green component $b_g$ of the ray exits the prism 60 at the exit face 63 thereof for transmission to the detector unit 20C at the center thereof.

Thus, it can be seen that at the first dichroic layer 45 the blue component of the incident light is separated and is reflected for emission from the optical system 10 at the exit face 43 to form the image on the blue light detector unit 20A, while the red component of the incident light is reflected at the second dichroic layer 55 for forming the image on the red light detector unit 20B, and the green light component is transmitted directly and unreflected through the optical system 10 for emission therefrom at the exit face 63 to form an image on the green light detector unit 20C.

In a constructional model of the optical system 10, the overall length D between the entrance face 41 of the prism 40 and the exit face 63 of the prism 60 is 1.1 inches. The effective height H of the entrance face 41 of the prism 40, i.e., the vertical distance between the point at which the uppermost limiting oblique ray $a_0$ is incident on the front thereof and the point at which the blue component $f_b$ of the lowermost limiting oblique ray is internally reflected at the rear thereof is substantially 0.99 inch. It will be appreciated that each of the overall length D and the effective height H is approximately three times the detector height (0.343 inch). Each of the exit faces 43, 53 and 63 has an effective height, i.e., the distance between the exit points thereon of the uppermost and lowermost limiting oblique image-forming rays, which effective height is substantially 0.4 inch. Thus, it can be appreciated that the effective heights of the exit faces 43, 53 and 63 are, respectively, slightly larger than but comparable to the corresponding heights (0.343 inch) of the associated detectors 25. The equivalent air track of the optical system 10 is 0.626 inch.

Figure 2:
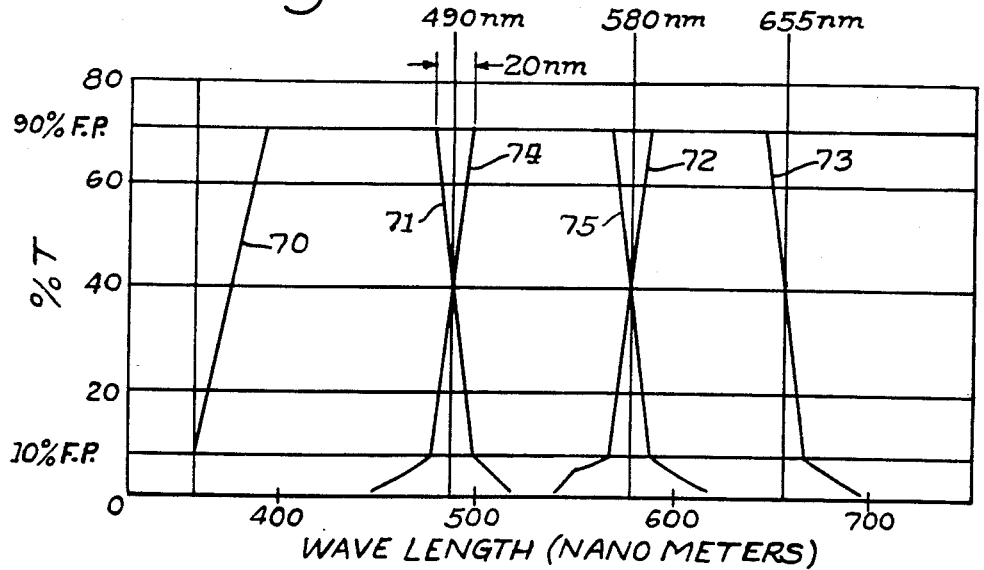
FIG. 2 is a graph of the color transmission characteristics of the prism system of FIG. 1.

FIG. 2 illustrates the color transmission characteristics of the optical system 10. This graph is a plot of the wavelength of the light in nanometers, along the horizontal axis, against the percentage of incident light emitted from the system along the vertical axis. The lines 70 and 71 indicate the blue light emitted from the exit face 43, the lines 72 and 73 indicate the red light emitted from the exit face 53, and the lines 74 and 75 indicate the green light which is emitted from the exit face 63.

The graph of FIG. 2 illustrates that the half-power points are at 40% amplitude and, therefore, at 90% of the full-power peaks at least 72% of the blue component of the incident light in the wavelengths between about 395 nanometers and 480 nanometers is emitted from the optical system 10 at the exit face 43, at least 72% of the green component of the incident light in the wavelengths between about 500 nanometers and 570 nanometers is emitted from the exit face 63, and at least 72% of the red component of the incident light in the wavelengths between 590 nanometers and 645 nanometers is emitted from the system 10 at the exit face 53. It will also be noted that the system has fairly sharp cutoff between the color components, with the transmittance curve for each component rising from 10% to 90% of peak transmittance over a spectral range of only about 20 nanometers.

Figure 3:
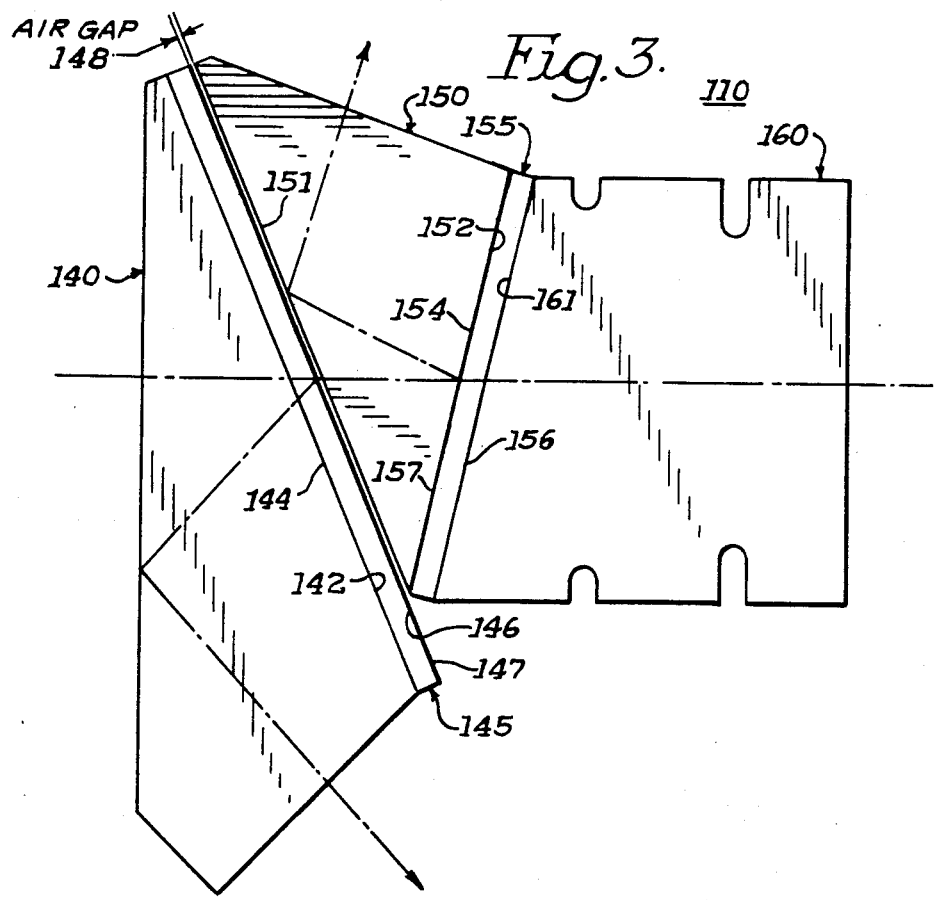
FIG. 3 is a view similar to FIG. 1 of a prism system using dichroic plates cemented to the prisms to form the dichroic layers.

While the dichroic layers 45 and 55 have been disclosed above as coatings directly on the associated exit faces of the prisms 40 and 50, it will be understood that these dichroic layers could also be in the form of dichroic plates cemented to the associated prism faces. Referring to FIG. 3 of the drawings, there is illustrated an optical system 110 which is substantially similar to the optical system 10, and includes three prisms, respectively generally designated by the numerals 140, 150 and 160, and respectively substantially identical to the prisms 40, 50 and 60 described above. The prism 140 has an exit face 142 to which is attached a first glass dichroic plate 145, the dichroic plate 145 having an entrance face 144 which is cemented to the exit face 142 of the prism 140, and an exit face 146 on which is coated a dichroic coating or layer 147. The exit face 146 of the dichroic plate 145 is spaced by an air gap 148 from the entrance face 151 of the prism 150.

A dichroic plate 155 is secured to the exit face 152 of the prism 150, the dichroic plate 155 having an entrance face 154 on which is coated a dichroic coating or layer 157, and which is cemented to the exit face 152 of the prism 150. The dichroic plate 155 also has an exit face 156 which is cemented to the entrace face 161 of the prism 160.

It will be appreciated that the dichroic plates 145 and 155 could be made in any shapes, and it can be seen that the dichroic layer may be applied to either the entrance face or the exit face of the plate, depending upon the requirements of the particular system. However, the path length must remain equal for all three colors.

The use of such dichroic plates affords important manufacturing advantages. When dichroic coatings are applied directly to the faces of prisms, careful handling of the optical components is required during the coating process to prevent damage from chipping, and custom-made expensive tooling is necessary. Also, since the surfaces to be coated must be laid into holders, some margins of the surfaces will not receive coating. If the coatings turn out to be unacceptable, prisms must be stripped and recoated, a procedure which is very expensive and which subjects the prisms to the risk of additional damage.

The dichroic plate substrates, on the other hand, are preferably of commercially available thin sheet glass, and can be coated in large sizes and be cut to size afterwards. Thus, fewer workpieces are handled and spectophotometric testing is greatly simplified. Should a coating be unacceptable, the substrate may simply be discarded since it is relatively inexpensive. Coated plates are cut to exact size and cemented directly to the appropriate prism faces. Thus, coating extends over the entire face area with no voids. Accordingly, the advantages of lower manufacturing cost and improved quality control are realized.

Figure 4:
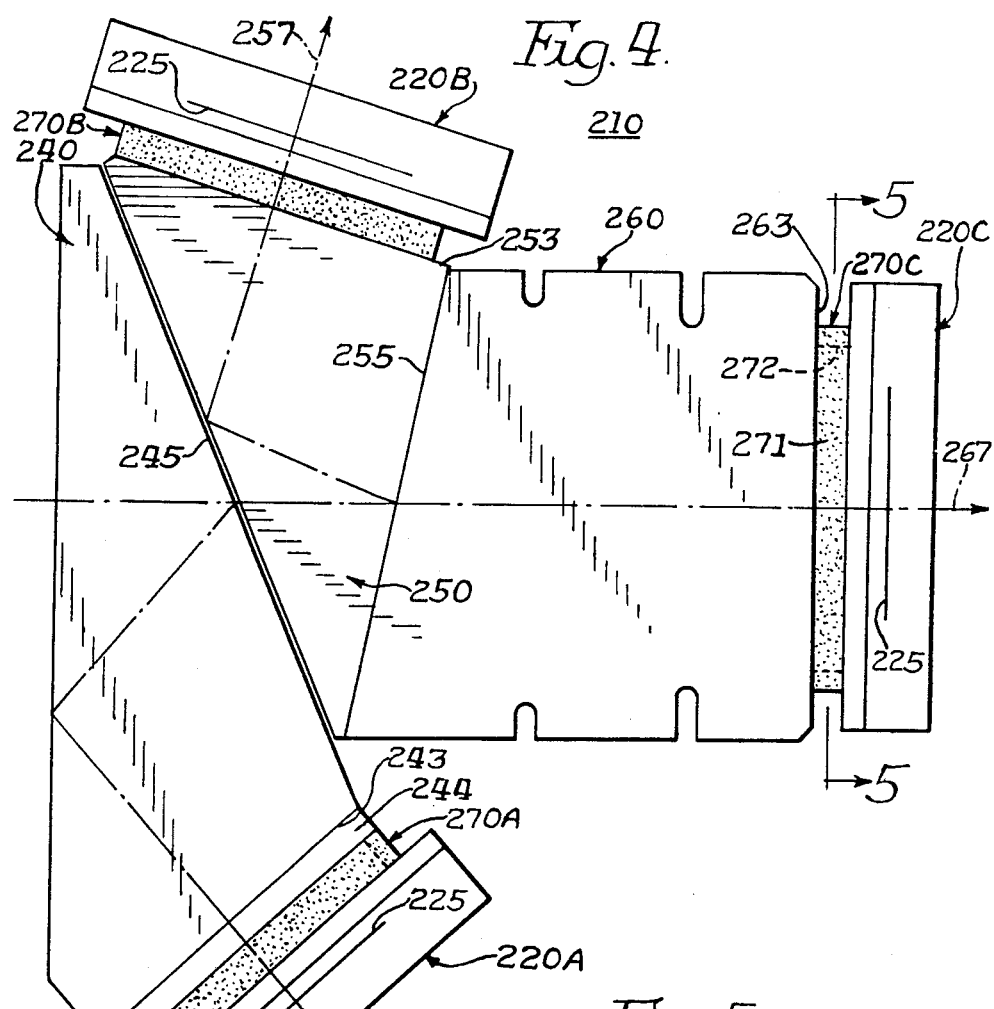
FIG. 4 is a view similar to FIG. 1, and illustrating means for mounting the detectors with respect to the prism system.
Figure 5:
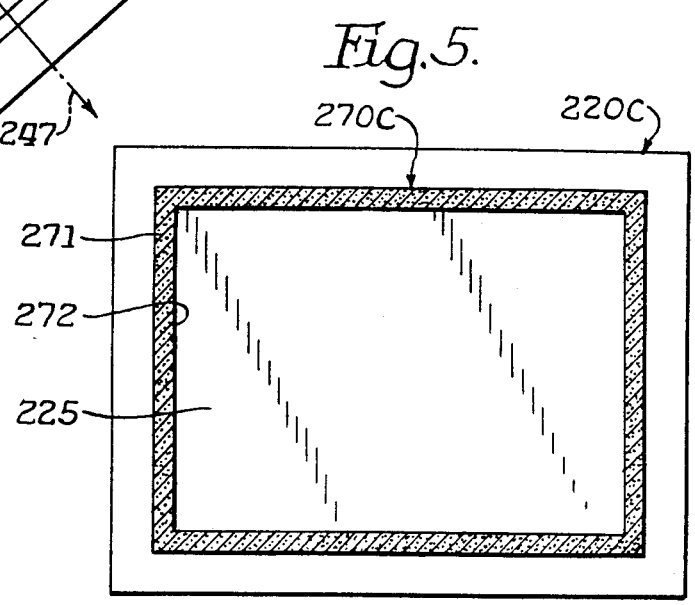
FIG. 5 is a view in vertical section taken along the line 5—5 in FIG. 4.

Referring now to FIGS. 4 and 5 of the drawings, there is illustrated an optical system 210 which is substantially identical to the optical system 10, and includes three prisms, respectively generally designated by the numerals 240, 250 and 260 which are respectively provided with exit faces 243, 253 and 263. Respectively emitted from the exit faces 243, 253 and 263 along exit paths having axes 247, 257 and 267, are the blue, red and green color components which are separated at dichroic layers 245 and 255, the exit face 243 being provided with an absorption filter 244. Respectively disposed adjacent to the exit faces 243, 253 and 263 are three solid-state color detector units 220A, 220B and 220C, each having a solid-state detector 225 and being respectively identical in construction to the detectors 20A–20C illustrated in FIG. 1. The detector units 220A–220C are respectively fixedly held in position with respect to the associated prism exit faces (or associated absorption filter) by mounting and positioning bodies 270A, 270B and 270C, which are preferably of identical construction, whereby only one will be described in detail.

Referring in particular to the mounting and positioning body 270C, it is in the form of a rectangular gasket 271 which has a rectangular opening 272 therethrough.

Preferably, the gasket 271 is formed of a flexible, resilient, foamed body of material such as foamed rubber or the like dimensioned to be disposed between the detector unit 220C and the associated prism exit face 263 in contact with each and in surrounding relationship with the detector 225, the dimensions of the opening 272 being such as to permit uninterrupted transmission of image-forming light rays from the exit face 263 to the detector 225.

In assembling the detector 220C in the optical system 10, the porous, resilient gasket 271 is first inserted between the detector unit 220C and the associated prism exit face 263, in contact with each, and in surrounding relationship with the detector 225, which is the sensitive image area of the detector unit 220C. The detector unit 220C is then accurately positioned with respect to the exit face 263 and with respect to the exit path axis 267 thereof by the use of suitable micropositioners or the like. More particularly, the detector unit 220C is positioned so that the detector 225 is precisely located in the associated one of the three conjugate lens focal planes in order to process the sharpest possible image. It is, therefore, necessary to position the detector unit 220C without tilt, i.e., so that the optical axis 267 is perpendicular to the detector surface, in proper X-Y-Z location, i.e., at the proper distance from the exit face 263 and in the proper position in the focal plane, and without rotation relative to the other detector units 220A and 220B, i.e., with all rows and columns of the charge-injection devices mutually parallel.

When the detector unit 220C has been accurately positioned in the predetermined proper position with respect to the exit face 263 and the axis 267, an adhesive and hardening cement, such as epoxy or the like, is applied around the gasket 271 or injected thereinto so as to impregnate the porous gasket, while the detector unit 220C is held in its proper position. Thus, after the epoxy hardens it forms a rigid body which provides a secure, rigid bond between the detector unit 220C and the prism 260 for maintaining the predetermined proper positions thereof with respect to each other.

It will be understood that the detector units 220A and 220B are positioned and mounted in the same manner. Because of the different sizes of the exit faces 243, 253 and 263, the mounting and positioning bodies 270A-270C may be of slightly different sizes, as long as the opening 272 is sufficiently large to permit uninterrupted passage of light rays to the detectors 225. In a constructional model of the optical system 220, the detector units 220A-220C are respectively spaced from the associated prism exit faces (or associated absorption filter) by a distance of approximately 1 millimeter. Thus, the foamed gaskets 271 will initially have a thickness slightly greater than 1 millimeter to accommodate movement of the associated detector unit 220 during the positioning operation.

Thus, it can be seen that there has been provided a unique color-separating prism system of extremely small dimensions which is uniquely suitable for use with the minute injection device color detectors in small, hand-held video color cameras.

While there have been described what are at present considered to be the preferred embodiments of the invention, it will be understood that various modifications may be made therein, and it is intended to cover in the appended claims all such modifications as fall within the true spirit and scope of the invention.

I claim:

1. An optical system separating color components of light directed along a non-reflecting optical axis in a small portable video color camera, said system comprising a prism assembly including first and second and third prisms and having a light entrance face on said first prism, a first dichroic plate fixedly secured to said first prism and spaced from said second prism by an air gap for receiving light entering said first prism through said input face and selectively reflecting a first color component while transmitting remaining light components to said second prism, a second dichroic plate disposed between said second and third prisms and fixedly secured to each for selectively reflecting a second color component while transmitting the remaining light component to said third prism, three exit faces respectively disposed on said three prisms for respectively emitting light components therefrom along three exit paths each having an axis, three detectors respectively disposed adjacent to said three exit faces and each having an image area thereon for receiving light rays emitted from the associated exit face, and three positioning means each including a rigid body disposed between the associated detector and the corresponding exit face and secured to each fixedly to hold the associated detector in a predetermined position with respect to the associated exit face and its axis, each said rigid body having an opening therethrough to accommodate uninterrupted passage of light rays from the corresponding exit face to said image area of said associated detector.

2. An optical system comprising an optical member having an axis, a detector disposed adjacent to said optical member along said axis and having an image area thereon for receiving light rays emitted from said optical member, and positioning means disposed between said optical member and said detector and secured to each and having an opening therethrough to accommodate uninterrupted passage of light rays from said optical member to said image area of said detector, said positioning means including a porous body impregnated with a hardening and adhesive agent for forming a rigid body fixedly to hold said detector in a predetermined position with respect to said optical member and said axis.

3. The optical system of claim 2, wherein said porous body is formed of foamed rubber and said hardening and adhesive agent is epoxy.

4. A method for fixedly positioning a detector having an image area thereon with respect to an optical member having an axis, said method comprising the steps of placing between and in contact with the optical member and the detector a porous flexible resilient body having an opening therethrough sufficient to permit uninterrupted passage of light rays from the optical member to the image area of the detector, adjusting the detector to a predetermined position with respect to the optical member and the axis thereof while maintaining the body in contact with the optical member and the detector, impregnating the porous body with a hardening and adhesive agent while holding the detector in said predetermined position, and allowing the agent to harden while holding the detector in the predetermined position thereby to form a rigid body fixedly secured to the optical member and to the detector and rigidly holding the detector in said predetermined position.

5. The method of claim 4, wherein said porous body is formed of foamed rubber and said hardening and adhesive agent is epoxy.

6. The combination of an optical member having an axis and a detector having an image area and rigidly held in a predetermined position with respect to the optical member and the axis, wherein the combination is formed by the process comprising the steps of placing between and in contact with the optical member and the detector a porous flexible resilient body having an opening therethrough sufficient to permit uninterrupted passage of light rays from the optical member to the image area of the detector, adjusting the detector to a predetermined position with respect to the optical member and the axis thereof while maintaining the body in contact with the optical member and the detector, impregnating the porous body with a hardening and adhesive agent while holding the detector in said predetermined position, and allowing the agent to harden while holding the detector in the predetermined position thereby to form a rigid body fixedly secured to the optical member and to the detector and rigidly holding the detector in said predetermined position.

7. The combination of claim 6, wherein said porous body is formed of foamed rubber and said hardening and adhesive agent is epoxy.

8. An optical system separating color components of light directed along a non-reflecting optical axis in a small portable video color camera, said system comprising a prism assembly including first and second and third prisms and having a light entrance face on said first prism, a first dichroic plate fixedly secured to said first prism and spaced from said second prism by an air gap for receiving light entering said first prism through said input face and selectively reflecting a first color component while transmitting remaining light components to said second prism, a second dichroic plate disposed between said second and third prisms and fixedly secured to each for selectively reflecting a second color component while transmitting the remaining light component to said third prism, three exit faces respectively disposed on said three prisms for respectively emitting light components therefrom along three exit paths each having an axis, three detectors respectively disposed adjacent to said three exit faces and each having an image area thereon for receiving light rays emitted from the associated exit face, and three positioning means respectively associated with said detectors, each said positioning means being disposed between the associated detector and the corresponding exit face and secured to each and having an opening therethrough to accommodate uninterrupted passage of light rays from said exit face to said image area of said detector, each said positioning means including a porous body impregnated with a hardening and adhesive agent for forming a rigid body fixedly to hold the associated detector in a predetermined position with respect to the associated exit face and its axis.

* * * * *